United States Patent
Tsushima (10) Patent No.: US 8,788,170 B2
(45) Date of Patent: Jul. 22, 2014

(54) LEFT-RIGHT WHEEL DRIVE FORCE DISTRIBUTION CONTROL APPARATUS FOR A VEHICLE

(75) Inventor: Yohei Tsushima, Hiratsuka (JP)

(73) Assignee: Nissan Motor Co., Ltd., Yokohama (JP)

( * ) Notice: Subject to any disclaimer, the term of this patent is extended or adjusted under 35 U.S.C. 154(b) by 31 days.

(21) Appl. No.: 13/700,345

(22) PCT Filed: Jul. 5, 2011

(86) PCT No.: PCT/JP2011/065398
§ 371 (c)(1),
(2), (4) Date: Nov. 27, 2012

(87) PCT Pub. No.: WO2012/005264
PCT Pub. Date: Jan. 12, 2012

(65) Prior Publication Data
US 2013/0073160 A1  Mar. 21, 2013

(30) Foreign Application Priority Data

Jul. 9, 2010 (JP) ................................ 2010-156666

(51) Int. Cl.
| | | |
|---|---|---|
| B60K 28/16 | (2006.01) | |
| G06F 17/00 | (2006.01) | |
| G06F 19/00 | (2011.01) | |
| B60W 10/12 | (2012.01) | |
| B60K 23/04 | (2006.01) | |
| B60K 17/344 | (2006.01) | |
| G05D 17/00 | (2006.01) | |
| F16H 48/19 | (2012.01) | |
| F16H 48/20 | (2012.01) | |

(52) U.S. Cl.
CPC ............... *G05D 17/00* (2013.01); *B60K 23/04* (2013.01); *B60K 17/344* (2013.01); *B60W 2720/30* (2013.01); *F16H 2048/205* (2013.01); *F16H 48/19* (2013.01); *B60K 2023/043* (2013.01)
USPC ................ 701/69; 701/74; 701/81; 701/90; 180/197

(58) Field of Classification Search
CPC .............. B60T 7/12; G05D 1/00; G06F 17/00; G06F 19/00; B60W 10/14; B60R 22/00
USPC ............. 701/1, 51, 53, 58, 60, 65, 67, 68, 69, 701/70, 71, 72, 74, 76, 77, 78, 80, 81, 82, 701/88, 89, 90; 180/170, 197, 271, 282; 340/438, 439, 440, 441
See application file for complete search history.

(56) References Cited

U.S. PATENT DOCUMENTS 4,871,043 A * 10/1989 Fujii et al. ...................... 180/248
5,301,768 A * 4/1994 Ishikawa et al. ............... 180/249

(Continued)

FOREIGN PATENT DOCUMENTS

| JP | 07-061779 | 3/1995 |
| JP | 09-193680 | 7/1997 |
| JP | 2007-209068 | 8/2007 |

OTHER PUBLICATIONS

International Search Report of PCT/JP2011/065398, dated Sep. 30, 2011, mailed Oct. 11, 2011.

(Continued)

*Primary Examiner* — Thomas Tarcza
*Assistant Examiner* — Edward Pipala
(74) *Attorney, Agent, or Firm* — Global IP Counselors, LLP (57) ABSTRACT

When a rear wheel total drive force is smaller than a rear wheel drive force difference and the rear wheel drive force difference cannot be accomplished by dividing the rear wheel total drive force between the left and right rear wheels, an inside wheel target drive force is not set to 0 and an outside wheel target drive force is not set to. Instead, the inside wheel target drive force is set to a default drive force that is a minimum value required to prevent a three-wheel drive state from occurring, and the outside wheel target drive force is set a value equal to the sum of the default drive force and the rear wheel drive force difference, which is a value with which the rear wheel drive force difference can be achieved under the condition of the inside wheel target drive force being equal to the default drive force.

10 Claims, 5 Drawing Sheets

(56) References Cited

U.S. PATENT DOCUMENTS 5,456,641 A * 10/1995 Sawase ............................ 475/86
5,701,247 A * 12/1997 Sasaki ............................... 701/1
5,740,877 A * 4/1998 Sasaki ........................... 180/248
5,754,970 A * 5/1998 Takasaki et al. ................. 701/87
5,803,197 A * 9/1998 Hara et al. .................... 180/248

OTHER PUBLICATIONS

An English translation of the Japanese Notification of Reason for Rejection of corresponding Japanese Application No. 2010-156666, issued on Mar. 5, 2013.

* cited by examiner

LEFT-RIGHT WHEEL DRIVE FORCE DISTRIBUTION CONTROL APPARATUS FOR A VEHICLE

CROSS-REFERENCE TO RELATED APPLICATIONS

This application is a U.S. National stage application of International Application No. PCT/JP2011/065398, filed Jul. 5, 2011, which claims priority claims priority under to Japanese Patent Application No. 2010-156666, filed in Japan on Jul. 9, 2010, the entire contents of which is hereby incorporated by reference.

BACKGROUND

1. Field of the Invention

The present invention generally relates to a proposal for improving a left-right wheel drive force distribution control apparatus that is useful for a vehicle, particularly a four-wheel drive vehicle.

2. Background Information

Japanese Laid-Open Patent Application Publication No. 09-328021 presents an example of a conventional left-right wheel drive force distribution control apparatus for a vehicle. The proposed technology relates to a four-wheel drive vehicle that can execute a distributed output of power from a prime mover to left and right front wheels acting as main drive wheels and left and right rear wheels acting as subordinate drive wheels, the technology serving to execute a distributed output of the drive force going to the rear wheel such that the drive force is distributed to the left and right rear wheels in accordance with a control.

SUMMARY

Meanwhile, regarding controlling a distribution of a drive force to left and right wheels of a vehicle, a recently proposed left-right wheel drive force distribution control (so-called "torque vectoring control") is configured to make the drive forces of the left and right wheels different such that a turning behavior of the vehicle corresponds to an operating state.

However, in the previously explained conventional left-right wheel drive force distribution control apparatus executes a left-right wheel drive force distribution based on a wheel speed difference of the left and right drive wheels. A problem that will now be explained occurs when, instead of accomplishing the drive force distribution based on a speed difference, a torque vectoring control that imposes a difference between the drive forces of the left and right wheels is used with the same control apparatus so as to obtain a vehicle turning behavior that corresponds to the operating state.

Thus, when the total drive force to be imparted to the left and right rear wheels is equal to or larger than the drive force difference to be imposed between the left and right rear wheels, the drive force difference to be imposed between the left and right wheels can be accomplished by dividing the total drive force between the left and right wheels. However, when the total drive force to be imparted to the left and right rear wheels is smaller than the drive force difference to be imposed between the left and right rear wheels, the drive force difference to be imposed between the left and right wheels cannot be accomplished by dividing the total drive force between the left and right rear wheels and the drive force of the rear wheel to receive the smaller drive force, i.e., the drive force of the rear wheel located on the inside with respect to the turning direction, is set to 0.

This means a drive force is not transmitted to one of the left and right wheels and the vehicle travels in a three-wheel drive state. Although the three-wheel drive state increases the turning performance of the vehicle, it is a problem because it degrades the turning stability.

The object of the present invention is to provide a vehicle left-right wheel drive force distribution control apparatus that can avoid the problem related to degrading the turning stability by preventing a three-wheel drive state from occurring, even in the previously explained situation, when torque vectoring control is executed to distribute the left and right drive wheels such that a drive force difference is imposed between the left and right drive wheels.

In order to achieve the object, a vehicle left-right wheel drive force distribution control apparatus according to the present invention is a vehicle left-right wheel drive force distribution control apparatus comprising a controller that is programmed to executes a distributed output of drive forces to left and right drive wheels in accordance with a front-rear wheel drive force distribution control. The controller includes a total drive force computing section, a drive force distribution section, a vehicle drive force insufficiency determining section and a target drive force limiting section. The total drive force computing section sets a total drive force target value for in accordance with a vehicle operating state. The drive force distribution section sets a left-right drive force difference between the drive forces to be distributed to the left and right drive wheels in accordance with the vehicle operating state and that computes a front-rear drive force distribution to be attained between front and rear drive wheels and a left-right drive force distribution for the left and right drive wheels based on the left-right drive force difference and the total drive force target value. The vehicle drive force insufficiency determining section determines whether the total drive force target value is equal to or larger than the left-right drive force difference. The target drive force limiting section distributes drive forces to the left and right drive wheels at the left and right drive force distribution values computed by the drive force distribution section upon the wheel drive force insufficiency determining section having determined that the total drive force target value is equal to or larger than the left-right drive force difference. The target drive force limiting section limits a smaller value of the left and right drive force distribution values computed by the drive force distribution section a minimum allowable value upon the wheel drive force insufficiency determining section determining that the total drive force target value is smaller than the left-right drive force difference.

With the left-right wheel drive force distribution control apparatus according to the present invention, when the drive forces of the left and right drive wheels are controlled to have a drive force difference between the left and right drive wheels, the smaller of the drive forces transmitted to the left and right drive wheels is prevented from falling below the minimum allowable value. As a result, even the drive wheel located on the inside with respect to the turning direction, which is the drive wheel to which the smaller drive force is transmitted, is prevented from having a drive force smaller than the minimum allowable value. Thus, a three-wheel drive state in which the turning stability of the vehicle is poor is prevented from occurring.

BRIEF DESCRIPTION OF THE DRAWINGS

Referring now to the attached drawings which form a part of this original disclosure.

FIG. 4 is an explanatory illustration that shows how an outside wheel target drive force TcOUT and an inside wheel target drive force TcIN are set before the left-right rear wheel target drive force computing section shown in FIG. 2 computes the left and right rear wheel target drive forces when a rear wheel total drive force TcLR is larger than a rear wheel drive force difference ΔTcLR. Portion (a) of the illustration shows levels of the rear wheel total drive force TcLR to be targeted and equal left and right distribution amounts thereof, and portion (b) of the illustration shows an outside wheel provisional drive force value tTcOUT (outside wheel target drive force TcOUT) and an inside wheel provisional drive force value tTcIN (inside wheel target drive force TcIN) computed based on the rear wheel drive force difference ΔTcLR to be targeted and the equal left and right distribution amounts of the rear wheel total drive force TcLR shown in (a).

FIG. 5 is an explanatory illustration that shows how the outside wheel target drive force TcOUT and the inside wheel target drive force TcIN are set before the left-right rear wheel target drive force computing section shown in FIG. 2 computes the left and right rear wheel target drive forces when a rear wheel total drive force TcLR is smaller than a rear wheel drive force difference ΔTcLR. Portion (a) of the illustration shows levels of the rear wheel total drive force TcLR to be targeted and equal left and right distribution amounts thereof, portion (b) of the illustration shows the outside wheel target drive force TcOUT and the inside wheel target drive force TcIN as computed in a conventional manner based on the rear wheel drive force difference ΔTcLR to be targeted and the equal left and right distribution amounts of the rear wheel total drive force TcLR shown in (a), and portion (c) shows the outside wheel target drive force TcOUT and the inside wheel target drive force TcIN as computed based on the rear wheel drive force difference ΔTcLR to be targeted using the process shown in FIG. 3.

DETAILED DESCRIPTION OF THE EMBODIMENTS

Embodiments of the present invention are described in detail below with reference to the embodiments in the drawings.

Figure 1:
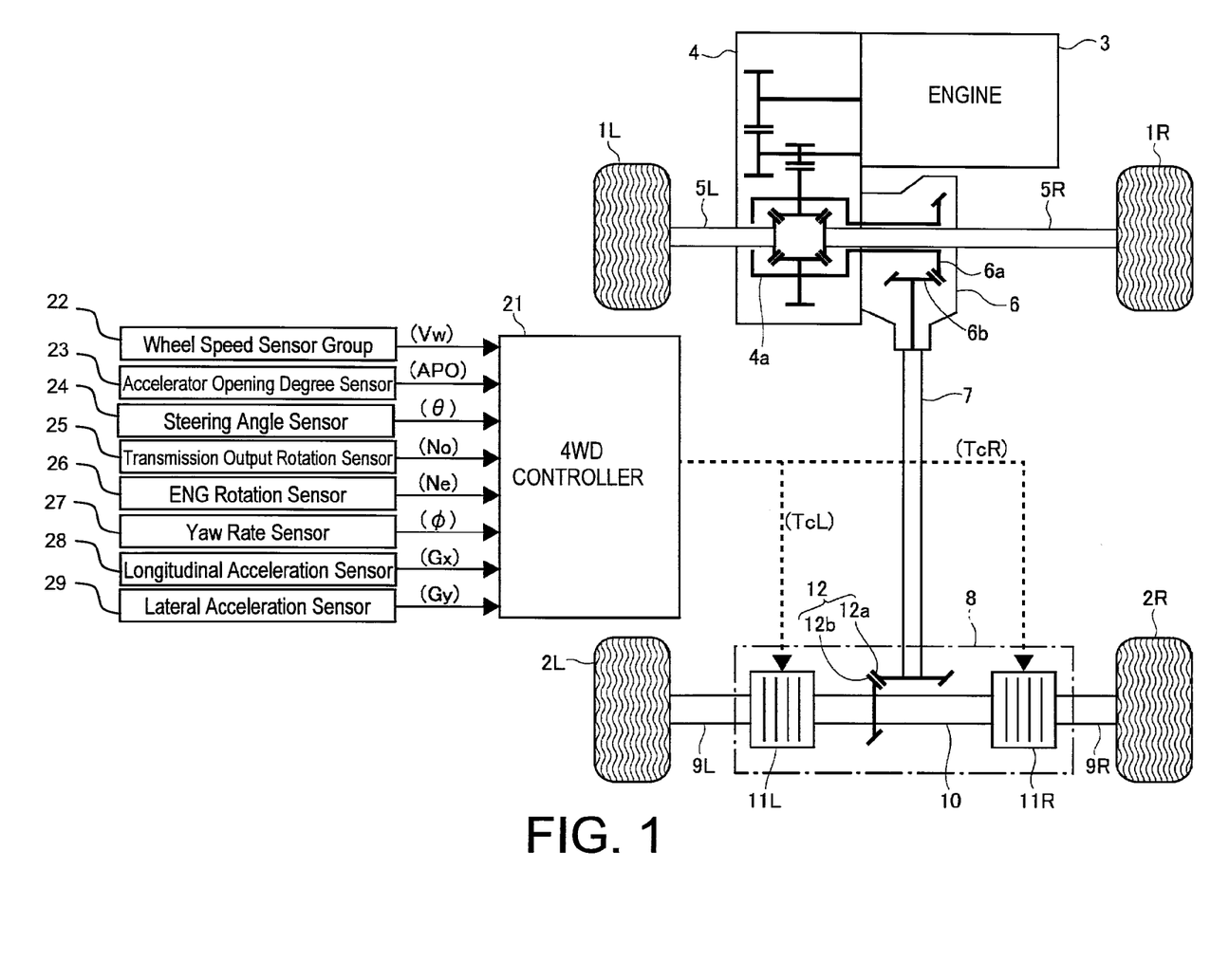
FIG. 1 is a schematic plan view showing a wheel drive train of a four-wheel drive vehicle equipped with a left-right wheel drive force distribution control apparatus according to an embodiment of the present invention as viewed from above the vehicle. A four-wheel drive control system is also shown.

FIG. 1 is a schematic plan view showing a wheel drive train of a four-wheel drive vehicle equipped with a left-right wheel drive force distribution control apparatus according to an embodiment of the present invention as viewed from above the vehicle. A four-wheel drive control system is also shown. The figure shows left and right front wheels 1L and 1R serving as main drive wheels and left and right rear wheels 2L and 2R serving as subordinate drive wheels. In this patent specification, the term "drive force" does not refer to power but, instead, refers to a torque value.

The reference numeral 3 indicates an engine serving as a prime mover. Torque from the engine 3 is multiplied by a transmission 4 (transaxle that includes a differential gear device 4a) and transferred toward the left and right front wheels 1L and 1R through left and right axle shafts 5L and 5R, thereby serving to drive the left and right front wheels 1L and 1R.

A portion of the drive force exiting the transmission 4 and heading toward the left and right front wheels 1L and 1R is redirected toward the left and right rear wheels 2L and 2R by a transfer case 6. A drive train used to accomplish this redirection will now be explained.

The transfer case 6 has a bevel gear set comprising an input hypoid gear 6a and an output hypoid gear 6b. The input hypoid gear 6a is coupled to a differential gear case serving as an input rotary member of the differential gear device 4a such that the input hypoid gear rotates together with the differential gear case. The output hypoid gear 6b is coupled to a front end of the propeller shaft 7, and the propeller shaft 7 is arranged to extend rearward toward a left-right rear wheel drive force distributing unit 8.

The transfer case 6 sets a gear ratio of the bevel gear set comprising the hypoid gear 6a and the output hypoid gear 6b such that a portion of a drive force heading toward the left and right front wheels 1L and 1R is converted to a higher rotational speed and outputted toward the propeller shaft 7.

The high-speed rotational power outputted to the propeller shaft 7 is distributed to the left and right rear wheels 2L and 2R by the left-right rear wheel drive force distributing unit 8 in accordance with a control explained later. The left-right rear wheel drive force distributing unit 8 has a center shaft 10 that is arranged between the axle shafts 9L and 9R of the left and right rear wheels 2L and 2R and extends along the axial direction of the shafts 9L and 9R. The left-right rear wheel drive force distributing unit 8 also has a left rear wheel clutch (left subordinate drive wheel friction element) 11L and a right rear wheel clutch (right subordinate drive wheel friction element) 11R. The left rear wheel clutch 11L is arranged between the center shaft 10 and the left rear wheel axle shaft 9L and serves to control a connection between the shafts 10 and 9L. The right rear wheel clutch 11R is arranged between the center shaft 10 and the right rear wheel axle shaft 9R and serves to control a connection between the shafts 10 and 9R.

A bevel gear type final reduction gear 12 provides a drive connection between the center shaft 10 and a rearward end of the propeller shaft 7 extending rearward from the transfer case 6. The final reduction gear 12 comprises an input hypoid gear 12a and an output hypoid gear 12b.

The reduction gear ratio of the final reduction gear 12 is set in relation to the speed-increasing gear ratio of the transfer case 6 (speed increasing gear ratio resulting from the bevel gear set comprising the hypoid gear 6a and the output hypoid gear 6b) to such a gear ratio that the portion of the drive force heading toward the left and right front wheels 1L and 1R that is redirected toward the center shaft 10 is delivered to the center shaft 10 with an increased rotational speed. In this embodiment, a total gear ratio of the transfer case 6 and the final reduction gear 12 is set such that a rotational speed of the center shaft 10 is increased with respect to the left and right front wheels 1L and 1R.

The reason for setting the total gear ratio of the transfer case 6 and the final reduction gear 12 in this way will now be explained. If the rotational speed of the center shaft 10 is not increased, then whichever of the left and right rear wheels 2L and 2R is the outside rear wheel during the turn will rotate at a higher rotational speed than the center shaft 10. Under such conditions, if the clutch 11L (or 11R) corresponding to the rear wheel 2L (or 2R) located on the outside of the turn is engaged, then the high rotational speed of that rear wheel will be dragged down by the more slowly rotating center shaft 10 until the rotational speed decreases to the rotational speed of the center shaft 10. Consequently, the center shaft 10 will not be able to transmit a drive force to the rear wheel 2L (or 2R) located on the outside of the turn and it will not be possible to achieve the intended drive force distribution control. As a result, the four-wheel drive control will not function properly.

Therefore, in order to ensure that during a turn the rotational speed of the center shaft 10 does not fall below the rotational speed of the rear wheel 2L (or 2R) located on the outside of the turn and cause the drive force distribution control to be ineffective, the total gear ratio of the transfer case 6 and the final reduction gear 12 is set as explained previously and the center shaft 10 is rotated at an increased rotational speed as explained previously. By rotating the center shaft 10 at an increased rotational speed, the drive force distribution control explained later can be accomplished as intended.

In the wheel drive train of the four-wheel drive vehicle explained above, torque from the engine 3 is multiplied by a gear ratio at the transmission (transaxle) 4 and transferred to the left and right front wheels 1L and 1R, thus driving the left and right front wheels 1L and 1R.

While this is occurring, a portion of the drive force heading toward the left and right front wheels 1L and 1R is transferred successively from the transfer case 6 to the propeller shaft 7, to the final reduction gear 12, and to the center shaft 10 at an increased rotational speed. The holding forces of the clutches 11L and 11R are controlled such that the clutches 11L and 11R slip in accordance with the amount of rotational speed increase while the left and right rear wheels 2L and 2R are driven. Thus, with the left and right front wheels 1L and 1R and the left and right rear wheels 2L and 2R driven in this way, the vehicle can be operated in four-wheel drive.

In this four-wheel drive vehicle, it is necessary to control the holding forces of the left rear wheel clutch 11L and the right rear wheel clutch 11R. In order to further the performance of this four-wheel drive vehicle when starting into motion from a stopped condition and when accelerating, the vehicle is further configured such that a front-rear wheel drive force distribution control can be executed by controlling a total holding force of the left wheel clutch 11L and the right wheel clutch 11R. Additionally, in order to improve a turning performance of the vehicle and execute a behavior control such that an actual behavior (actual yaw rate, etc.) of the vehicle matches a target based on an operating state and a traveling condition of the vehicle, a left-right wheel drive force distribution control is executed by controlling the holding forces of the left rear wheel clutch 11L and the right rear wheel clutch 11R.

Therefore, a holding force control system of the left rear wheel clutch 11L and the right rear wheel clutch 11R is configured as will now be explained. Each of the left rear wheel clutch 11L and the right rear wheel clutch 11R is an electromagnetic clutch in which the holding force is determined based on a supplied current. A four-wheel drive (4WD) controller 21 accomplishes the aforementioned front-rear wheel drive force distribution control and left-right wheel drive force distribution control by electronically controlling electric currents supplied to the clutches 11L and 11R such that the holding forces of the clutches 11L and 11R correspond to target drive forces TcL and TcR of the left and right rear wheels 2L and 2R, respectively, which are computed as will be explained later.

In order to compute a target drive force TcL of the left wheel 2L and a target drive force TcR of the right wheel, the four-wheel drive controller 21 receives the following input signals: a signal from a wheel speed sensor group 22 that a wheel speed Vw of each of the wheels 1L, 1R, 2L, and 2R; a signal from an accelerator opening degree sensor 23 that detects an accelerator opening degree APO as an accelerator pedal depression amount; a signal from a steering sensor 24 that detects a steering wheel steering angle θ; a signal from a transmission output rotation sensor 25 that detects a transmission output rotational speed No; a signal from an engine rotation sensor 26 that detects an engine rotational speed Ne; a signal from a yaw rate sensor 27 that detects a yaw rate □ about a vertical axis passing through a center of gravity of the vehicle; a signal from a longitudinal acceleration sensor 28 that detects a longitudinal acceleration Gx of the vehicle; and a lateral acceleration signal 29 that detects a lateral acceleration Gy of the vehicle.

Based on the input information just explained, the four-wheel drive controller 21 computes a left rear wheel target drive force TcL and a right rear wheel target drive TcR to be used for the front-rear wheel drive force distribution control and the left-right wheel drive force distribution control and electronically controls the holding forces (electric currents) of the left rear wheel clutch 11L and the right rear wheel clutch 11R such that the drive forces of the left and right rear wheels 2L and 2R match the target drive forces TcL and TcR.

<Drive Force Distribution Control>

The front-rear wheel drive force distribution control and the left-right wheel drive force distribution control executed by the four-wheel drive controller 21, i.e., the method of setting the left rear wheel target drive force TcL and the right rear wheel target drive force TcR, will now be explained.

Figure 2:
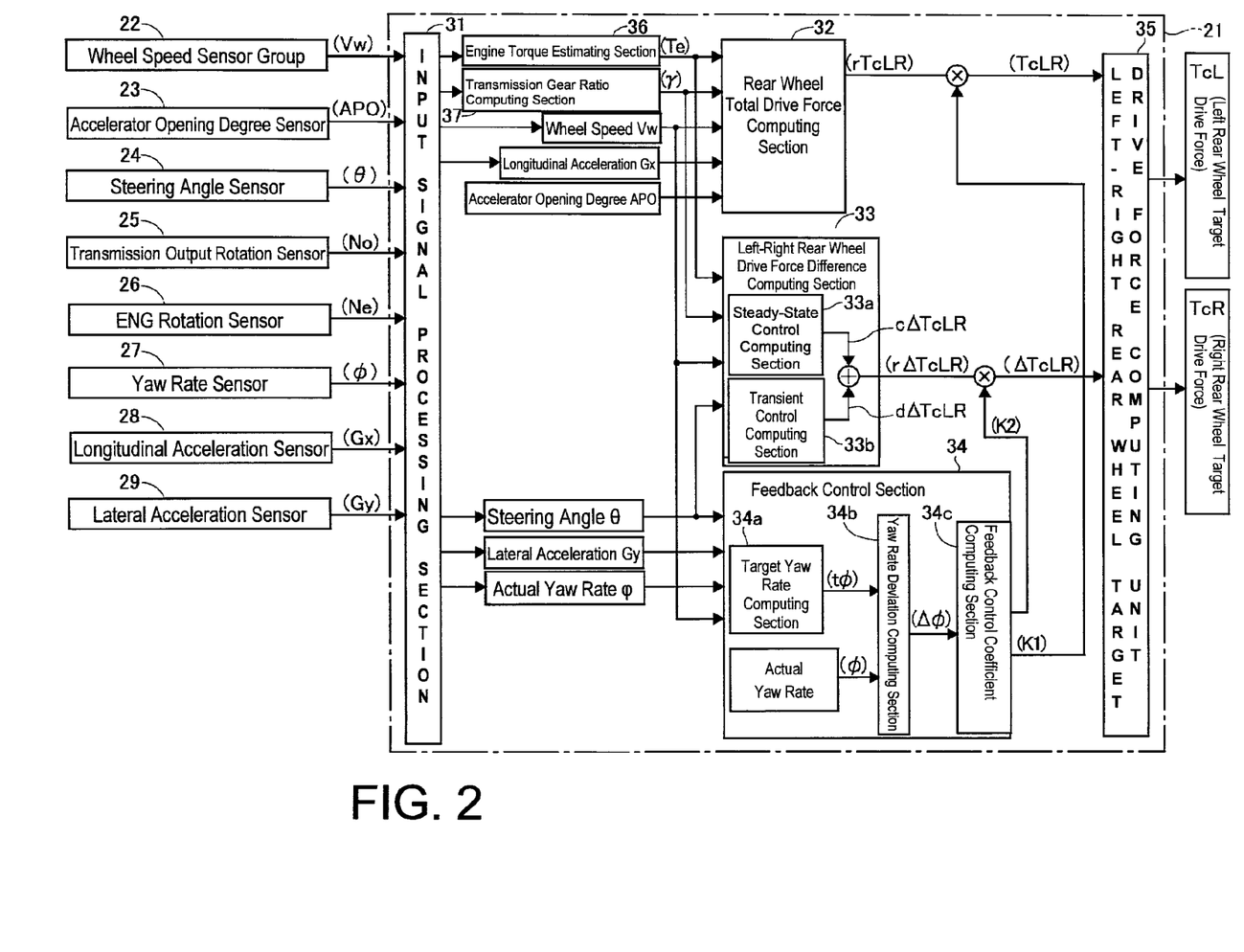
FIG. 2 is a function-specific block diagram of the four-wheel drive controller shown in FIG. 1.

As shown in function-specific block diagram of FIG. 2, the four-wheel drive controller 21 comprises an input signal processing section 31, a rear wheel total drive force computing section 32, a left-right rear wheel drive force difference computing section 33, a feedback control section 34, and a left-right rear wheel target drive force computing section 35.

The input signal processing section 31 removes noise from the detection signals of the wheel speed sensor group 22, the accelerator opening degree sensor 23, the steering angle sensor 24, the transmission output rotation sensor 25, the engine rotation sensor 26, the yaw rate sensor 27, the longitudinal acceleration sensor 28, and the lateral acceleration sensor 29 and pre-processes the signals such that they can be used in computations that will be explained later. Among these pre-processed signals, the engine rotational speed Ne and the accelerator opening degree APO are used by an engine torque estimating section 36 to estimate an engine torque Te, and the engine rotational speed Ne and the transmission output rotational speed No are used by a transmission gear ratio computing section 37 to compute a transmission gear ratio γ.

An example of how the rear wheel total drive force computing section 32 computes a total drive force target value rTcLR (hereinafter called "total drive force rTcLR") for the left and right rear wheels 2L and 2R will now be explained. First, the drive force computing section 32 computes an input torque Ti to the differential gear device 4a based on the engine torque Te and the transmission gear ratio γ. Next, the computing section 32 calculates left-right front wheel average speed and a left-right rear wheel average speed based on signals (wheel speeds Vw) from the wheel speed sensor group 22 and determines a degree of drive slippage of the left and right front wheels 1L and 1R estimated by comparing the two average speeds. The computing section 32 also determines how much of the input torque Ti to direct toward the left and right rear wheels 2L and 2R in accordance with the degree of drive slippage, the longitudinal acceleration, and the accelerator opening degree APO and sets that amount as a total drive force rTcLR to be directed to the rear wheels.

The larger the aforementioned front wheel slippage is, the larger the total drive force rTcLR to be directed to the rear wheels needs to be in order to suppress the slippage. Meanwhile, the larger the longitudinal acceleration Gx and the accelerator opening degree APO are, the larger the drive force requested by the driver is and the larger the total drive force rTcLR directed to the rear wheels needs to be in order to satisfy the request.

The left-right rear wheel drive force difference computing section 33 has a steady-state control computing section 33a and a transient control computing section 33b and calculates a drive force difference target value rΔTcLR (hereinafter called drive force difference rΔTcLR) between the left and right rear wheels 2L and 2R as, for example, will now be explained.

The steady-state control computing section 33a calculates a left-right rear wheel drive force difference steady-state control amount cΔTcLR for achieving a vehicle turning behavior requested by a driver in a steady manner as will now be explained. The steady-state control computing section 33a estimates a longitudinal acceleration rate Gx of the vehicle based on the engine torque Te and the transmission gear ratio γ and a lateral acceleration rate Gy of the vehicle based on a steering angle θ and a vehicle speed VSP. An under-steering state (state in which an actual turning behavior is insufficient in relation to a target turning behavior) can be ascertained based on a combination of the estimated longitudinal acceleration rate Gx and lateral acceleration rate Gy. The steady-state control computing section 33a determines a left-right rear wheel drive force difference necessary to resolve the under-steering state as a left-right rear wheel drive force steady-state control amount cΔTcLR. The reason estimated values of the longitudinal acceleration rate Gx and the lateral acceleration rate Gy are used instead of detected values is that the steady-state control computing section 33a is a feed forward control system and an estimated value matches the actual state of the control better than a detected value, which is a result value.

Thus, while the steering angle θ is near 0 (while the wheels are not being turned), the left-right rear wheel drive force difference steady-state control amount cΔTcLR is held at 0 because the lateral acceleration rate Gy equals 0. Conversely, while the steering angle θ is not near 0 (while the wheels are being turned), the lateral acceleration rate Gy increases as the steering angle θ and the vehicle speed VSP increase and there is a strong tendency for the vehicle to experience under-steering. Consequently, the left-right rear wheel drive force difference steady-state control amount cΔTcLR increases. Furthermore, as the longitudinal acceleration rate Gx increases, the tendency for the vehicle to experience under-steering strengthens and the left-right rear wheel drive force difference steady-state control amount cΔTcLR increases.

The transient control computing section 33b calculates a left-right rear wheel drive force difference transient control amount dΔTcLR for achieving a turning response requested by a driver in a transient manner due to the change rate of the steering angle θ. That is, based the steering angle θ and the vehicle speed VSP, the computing section 33 computes a target yaw rate desired by the driver. The higher a change rate of the target yaw rate is, the higher the desired turning response is and, accordingly, the left-right rear wheel drive force difference excessive control amount dΔTcLR is set to a larger value. The reason the target yaw rate is used instead of a yaw rate detection value $\phi$ is that the transient control computing section 33b is a feed forward control system and the target yaw rate (which is an estimated value) matches the actual state of the control better than a detected value (which is a result value).

The left-right rear wheel drive force difference computing section 33 calculates a sum value of the left-right rear wheel drive force difference steady-state control amount cΔTcLR calculated by the steady-state control computing section 33a as explained previously and the left-right rear wheel drive force difference transient control amount dΔTcLR calculated by the transient control computing section 33b as explained previously and sets the sum value as a left-right rear wheel drive force difference rΔTcLR to serve as a target during the vehicle turning behavior.

However, there are situations in which the actual turning behavior (actual yaw rate $\phi$) actually exhibited by the vehicle in response to the left-right rear wheel drive force difference rΔTcLR is affected by a lateral wind or other external disturbance and does not match the target turning behavior (target yaw rate t$\phi$) requested through the steering operation performed by the driver. When the actual yaw rate $\phi$ and the target yaw rate t$\phi$ do not match, the feedback control section 34 revises the rear wheel total drive force rTcLR and the rear wheel drive force difference rΔTcLR as explained below such that a final rear wheel total drive force TcLR and rear wheel drive force difference ΔTcLR are obtained.

The feedback control section 34 has a target yaw rate computing section 34a, a yaw rate deviation computing section 34b, and a feedback control coefficient computing section 34c. The target yaw rate computing section 34a computes a target yaw rate t$\phi$ desired by the driver based on the steering angle θ, the wheel speeds Vw (vehicle speed VSP), and the lateral acceleration Gy. The yaw rate deviation computing section 34b computes a yaw rate deviation Δ$\phi$ (=$\phi$-t$\phi$) between the target yaw rate t$\phi$ and a detected actual yaw rate $\phi$.

Based on the yaw rate deviation Δ$\phi$, the feedback control coefficient computing section 34c determines if the vehicle is in an over-steered state in which the actual yaw rate $\phi$ exceeds the target yaw rate t$\phi$ beyond a dead band, in an under-steered state in which the actual yaw rate $\phi$ is insufficient with respect to the target yaw rate t$\phi$ beyond a dead zone, or in a neutral steering state in which the actual yaw rate $\phi$ is within dead zones in front of and behind the target yaw rate t$\phi$. Based on this determination result, the feedback control coefficient computing section 34c sets a feedback control coefficient K1 (0 or 1) for the rear wheel total drive force rTcLR and a feedback control coefficient K2 (0 or 1) for the rear wheel drive force difference rΔTcLR.

The feedback control coefficient K1 is multiplied by the rear wheel total drive force rTcLR to calculate a revised final rear wheel total drive force TcLR, and the feedback control coefficient K2 is multiplied by the rear wheel drive force difference rΔTcLR to calculate a revised final rear wheel drive force difference ΔTcLR.

Regarding setting the feedback control coefficients K1 and K2, if the feedback control coefficient computing section 34c determines that the vehicle is in an over-steered state ($\Phi$>t$\Phi$+ dead band), then it sets the feedback control coefficient K1 for the rear wheel total drive force rTcLR to 0 and sets the feedback control coefficient K2 for the rear wheel drive force difference rΔTcLR to 0 in order to eliminate harmful effects caused by four-wheel drive travel. Setting the feedback control coefficient K1 to 0 causes the revised final rear wheel total drive force TcLR to be 0, and setting the feedback control coefficient K2 to 0 causes the revised final rear wheel drive force difference ΔTcLR to be 0. This means the vehicle travels in two-wheel drive and, as a result, the harmful effects that could result from traveling in four-wheel drive while in an over-steered state can be eliminated.

If the feedback control coefficient computing section 34c determines that the vehicle is in an under-steered state (Φ<tΦ−dead band), then, although there are no harmful effects caused by four-wheel drive travel, the feedback control coefficient computing section 34c sets the feedback control coefficient K1 for the rear wheel total drive force rTcLR to 1 and sets the feedback control coefficient K2 for the rear wheel drive force difference rΔTcLR to 0 in order to eliminate harmful effects caused by setting a drive force difference between the left and right rear wheels. Setting the feedback control coefficient K1 to 1 causes the revised final rear wheel total drive force TcLR to be set as TcLR=rTcLR, and setting the feedback control coefficient K2 to 0 causes the revised final rear wheel drive force difference ΔTcLR to be 0. This means that the vehicle is operated in four-wheel drive but a drive force difference is not set between the left and right rear wheels. As a result, excellent traction can be enjoyed by operating in four-wheel drive while in an under-steered state while eliminating the harmful effects of setting a drive force difference between the left and right rear wheels.

If the feedback control coefficient computing section 34c determines that the vehicle is in a neutral steering state (tΦ−dead band<Φ<tΦ+dead band), then the feedback control coefficient computing section 34c sets the feedback control coefficient K1 for the rear wheel total drive force rTcLR to 1 and sets the feedback control coefficient K2 for the rear wheel drive force difference rΔTcLR to 1 because there are no harmful effects caused by four-wheel drive travel and no harmful effects caused by setting a drive force difference between the left and right rear wheels. Setting the feedback control coefficient K1 to 1 causes the revised final rear wheel total drive force TcLR to be set as TcLR=rTcLR, and setting the feedback control coefficient K2 to 1 causes the revised final rear wheel drive force difference ΔTcLR to be set as ΔTcLR=rΔTcLR. This means that the vehicle is operated in four-wheel drive and a drive force difference is set between the left and right rear wheels.

Figure 3:
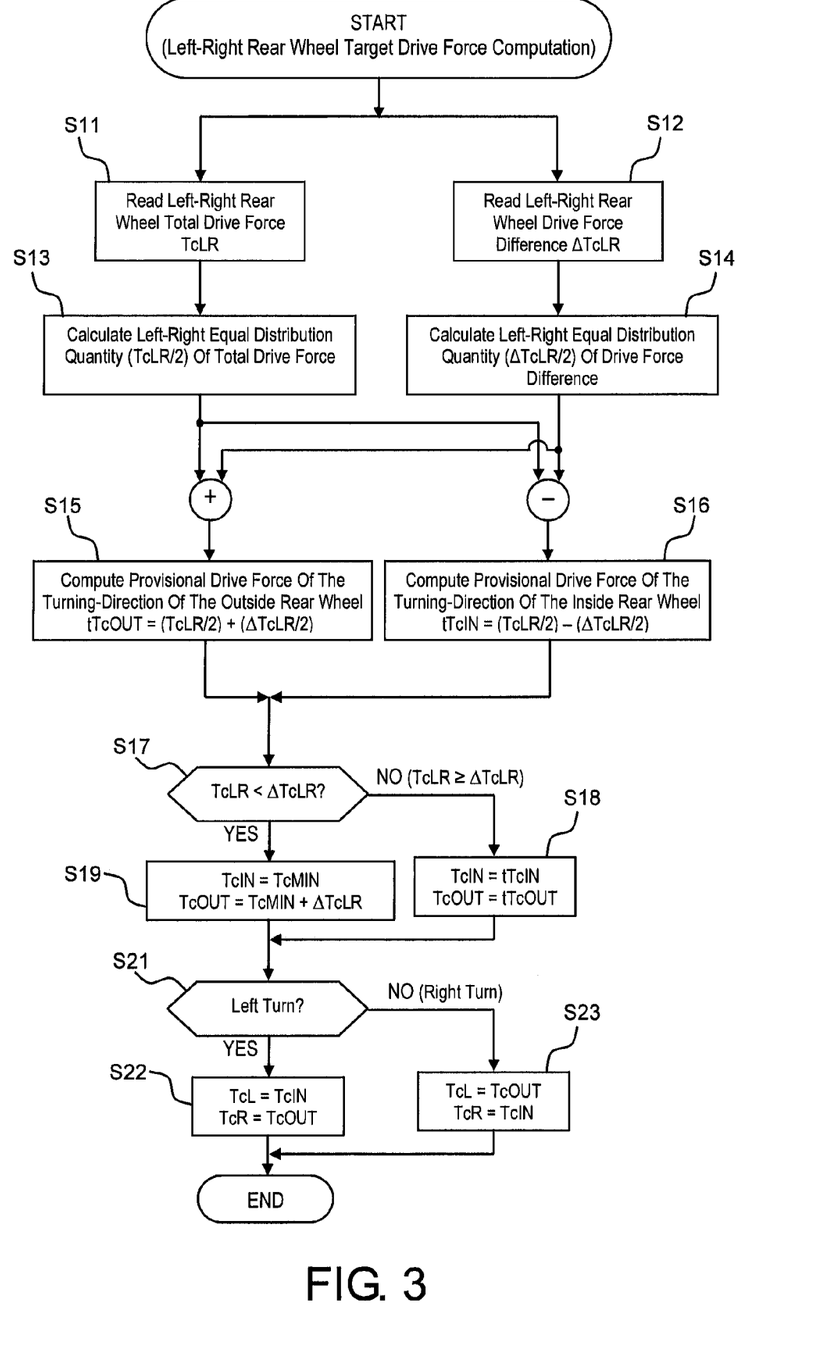
FIG. 3 is a flowchart showing a process by which the left-right rear wheel target drive force computing section shown in FIG. 2 computes left and right rear wheel target drive forces.

Based on the process shown in FIG. 3, the left-right rear wheel target drive force computing section 35 calculates a left rear wheel target drive force TcL and a right rear wheel target drive force TcR for satisfying both the left-right rear wheel total drive force TcLR and the left-right rear wheel drive force difference ΔTcLR, which are to be the revised final targets.

In step S11, the left-right rear wheel target drive force computing section 35 reads the final rear wheel total drive force TcLR revised by the previously explained feedback control, and in step S12, the left-right rear wheel target drive force computing section 35 reads the final left-right rear wheel drive force difference ΔTcLR revised by the feedback control.

In step S13, the left-right rear wheel target drive force computing section 35 calculates a left-right equal distribution quantity TcLR/2 of the rear wheel total drive force TcLR read in step S11, and in step S14, the left-right rear wheel target drive force computing section 35 calculates a left-right equal distribution quantity ΔTcLR/2 of the rear wheel drive force difference ΔTcLR read in step S12. In step S15, the left-right rear wheel target drive force computing section 35 adds the rear wheel drive force difference left-right equal distribution quantity ΔTcLR/2 to the rear wheel total drive force left-right equal distribution quantity TcLR/2 to calculate a provisional drive force value tTcOUT (=TcLR/2+ΔTcLR/2) of the turning-direction outside rear wheel. In step S16, the left-right rear wheel target drive force computing section 35 subtracts the rear wheel drive force difference left-right equal distribution quantity ΔTcLR/2 from the rear wheel total drive force left-right equal distribution quantity TcLR/2 to calculate a provisional drive force value tTcIN (=TcLR/2−ΔTcLR/2) of the turning-direction inside rear wheel.

If the rear wheel total drive force TcLR is equal to or larger than the rear wheel drive force difference ΔTcLR, i.e., if it is possible to achieve the rear wheel drive force difference ΔTcLR by dividing the rear wheel total drive force TcLR between the left and right rear wheels, then the provisional drive force value tTcOUT of the turning-direction outside rear wheel and the provisional drive force value tTcIN of the turning-direction inside rear wheel correspond to a target drive force for the turning-direction outside rear wheel and a target drive force for the turning-direction inside rear wheel for achieving both the rear wheel total drive force TcLR and the rear wheel drive force difference ΔTcLR. Thus, step S15 and step S16 correspond to the left-right wheel target drive force computing means mentioned in the claims.

In step S17 and subsequent steps, the left-right rear wheel target drive force computing section 35 sets the left rear wheel target drive force TcL and the right rear wheel target drive force TcR based on the provisional drive force value tTcOUT of the turning-direction outside rear wheel and the provisional drive force value tTcIN of the turning-direction inside rear wheel as will now be explained. First in step S17, the left-right rear wheel target drive force computing section 35 determines if the rear wheel total drive force TcLR read in step S11 is equal to or larger than the rear wheel drive force difference ΔTcLR read in step S12, i.e., if the rear wheel drive force difference ΔTcLR can be achieved by dividing the rear wheel total drive force TcLR between the left and right rear wheels. Thus, step S17 corresponds to the wheel drive force insufficiency determining means mentioned in the claims.

If it is determined in step S17 that TcLR≥ΔTcLR, then the outside wheel provisional drive force value tTcOUT calculated in step S15 and the inside wheel provisional drive force value tTcIN calculated in step S16 are an outside wheel drive force and an inside wheel drive force that satisfy both the left-right rear wheel total drive force TcLR and which left-right rear wheel drive force difference ΔTcLR (which are targets) as explained previously. Thus, in step S18, the left-right rear wheel target drive force computing section 35 sets the outside wheel provisional drive force value tTcOUT directly as the outside wheel target drive force TcOUT and sets the inside wheel provisional drive force value tTcIN directly as the inside wheel target drive force TcIN.

The processing steps executed until the outside wheel target drive force TcOUT and the inside wheel target drive force TcIN are set in step S18 as described above will now be explained with reference to FIG. 4. The level of the rear wheel total drive force TcLR read in step S11 is shown on the far left of the portion (a) of FIG. 4, and the level of the rear wheel drive force difference ΔTcLR read in step S12 is shown on the far left of the portion (b). The portion (a) also shows the equal left and right distribution amounts TcLR/2 (step S13) of the rear wheel total drive force TcLR.

Figure 4:
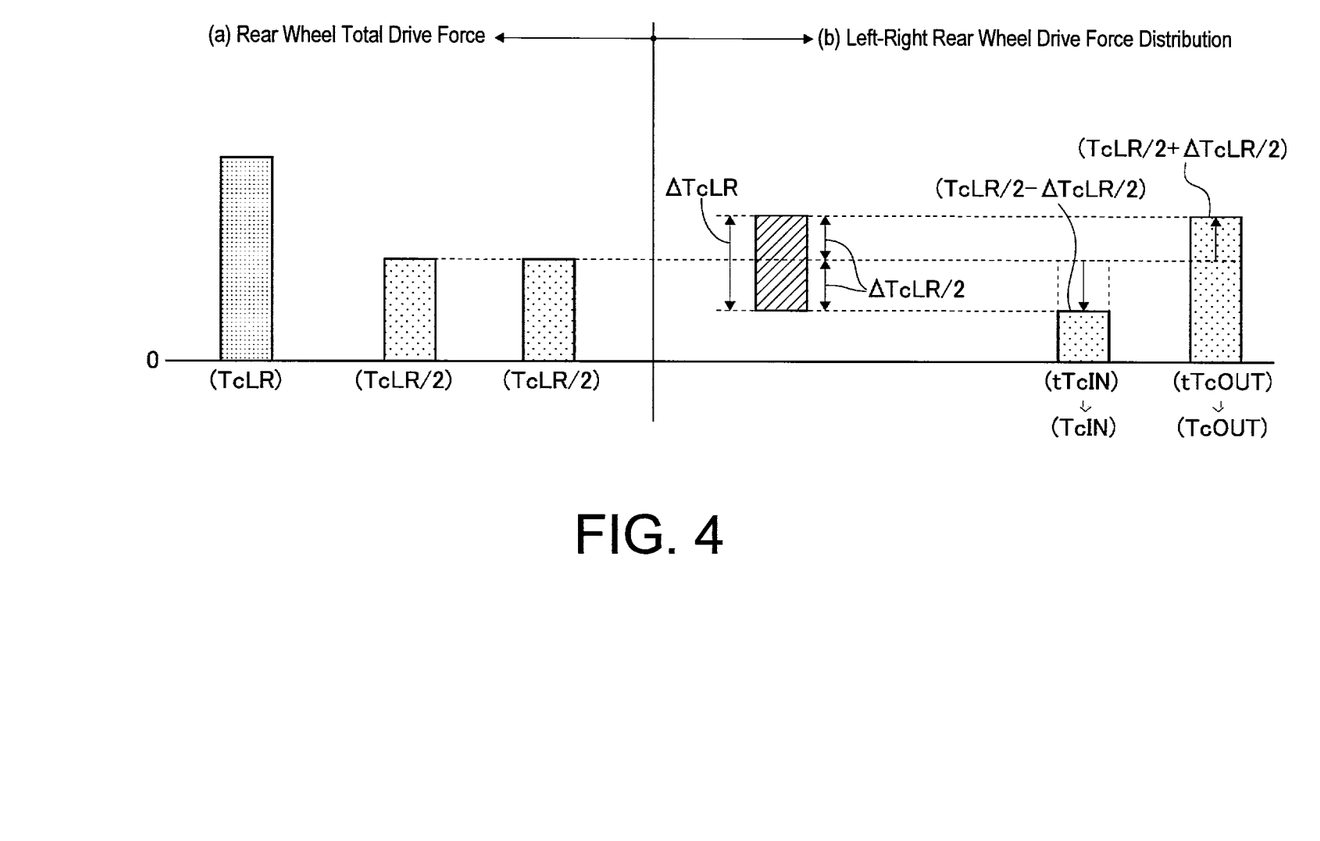

Based on the left and right equal distribution amount TcLR/2 (step S13) and the left and right equal distribution amount ΔTcLR/2 of the rear wheel drive force difference ΔTcLR shown on the far left of FIG. 4 (b) and calculated in step S14, the left-right rear wheel target drive force computing section 35 calculates the outside wheel provisional drive force value tTcOUT (=TcLR/2+ΔTcLR/2) (step S15) and the inside wheel provisional drive force value tTcIN (=TcLR/2−ΔTcLR/2) (step S16).

In the case shown in FIG. 4, TcLR≥ΔTcLR as shown on the leftmost sides of portions (a) and (b) of the same figure and the drive force difference ΔTcLR can be achieved by dividing the total drive force TcLR between the left and right rear wheels. Therefore, the left-right rear wheel target drive force computing section 35 proceeds from step S17 to step S18 and sets the outside wheel provisional drive force value tTcOUT directly as the outside wheel target drive force TcOUT and sets the inside wheel provisional drive force value tTcIN directly as the inside wheel target drive force TcIN as shown in FIG. 4 (b).

The sum of the outside wheel target drive force TcOUT and the inside wheel target drive force TcIN equals the rear wheel total drive force TcLR shown in FIG. 4 (a), and the difference between the same equals the rear wheel drive force difference ΔTcLR as is clearly shown in FIG. 4 (b). Therefore, it is possible to execute a drive force distribution control that satisfies both the rear wheel total drive force TcLR and the rear wheel drive force difference ΔTcLR being targeted.

After the outside wheel target drive force TcOUT and the inside wheel target drive force TcIN have been set, the left-right rear wheel target drive force computing section 35 proceeds to step S21 and determines if the vehicle is turning left or turning right based on the steering angle θ and the yaw rate □.

If it is a left turn, then in step S22 the left-right rear wheel target drive force computing section 35 sets the inside wheel target drive force TcIN as the target drive force TcL of the left rear wheel (which is the turning-direction inside wheel) and sets the outside wheel target drive force TcOUT as the target drive force TcR of the right rear wheel (which is the turning-direction outside wheel). Conversely, if it is a right turn, then in step S23 the left-right rear wheel target drive force computing section 35 sets the outside wheel target drive force TcOUT as the target drive force TcL of the left rear wheel (which is the turning-direction outside wheel) and sets the inside wheel target drive force TcIN as the target drive force TcR of the right rear wheel (which is the turning-direction inside wheel).

The four-wheel drive controller 21 shown in FIG. 1 controls electric currents supplied to the left rear wheel clutch 11L and the right rear wheel clutch 11R such that the holding forces of the left rear wheel clutch 11L and the right rear wheel clutch 11R correspond to the left wheel target drive force TcL and the right rear wheel target drive force TcR set by the computing section 35 shown in FIG. 2 as explained previously.

Figure 5:
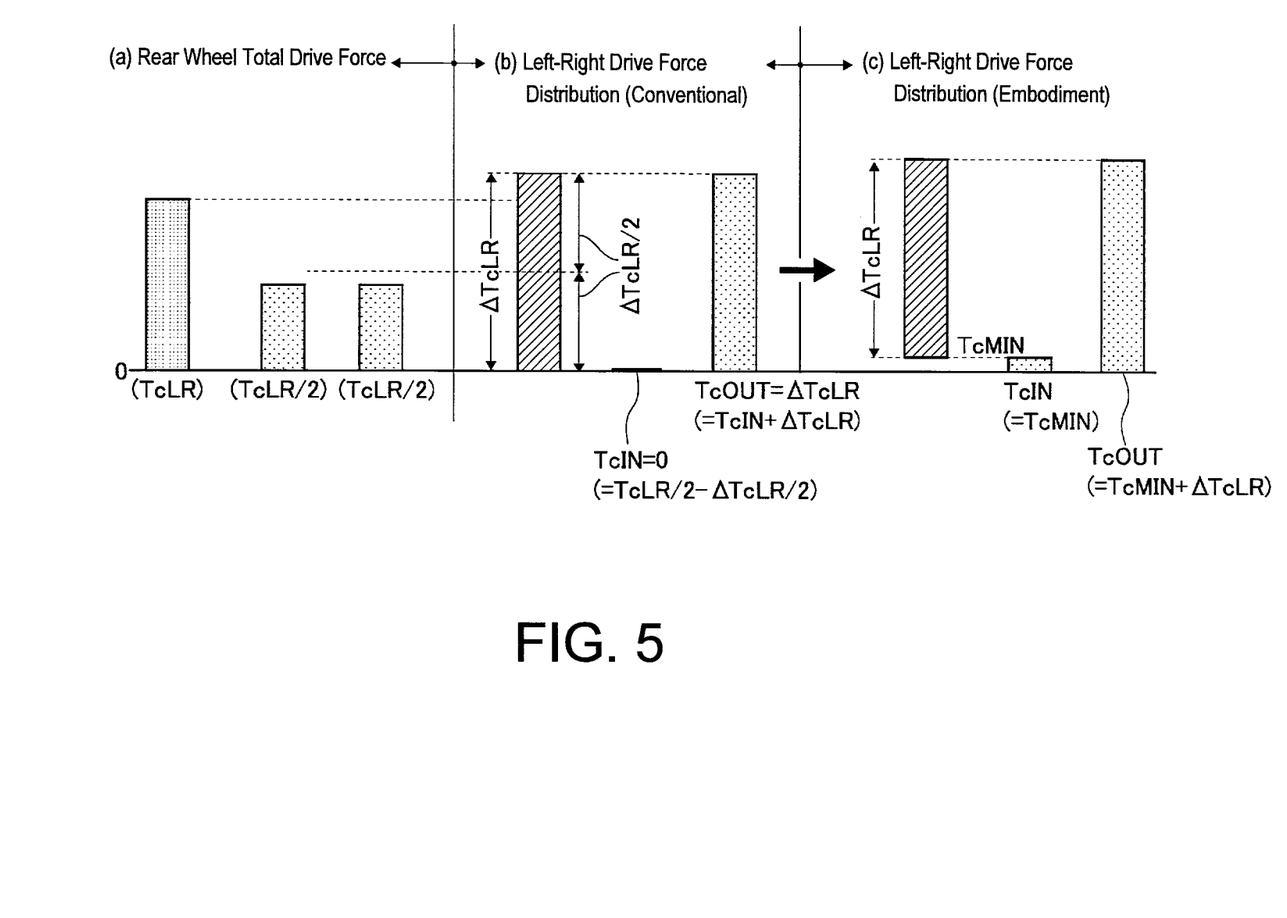

The control proceeds from step S17 of FIG. 3 to step S19 if the left-right rear wheel target drive force computing section 35 determines that the rear wheel total drive force TcLR shown on the far left of FIG. 5 (a) is smaller than the rear wheel drive force difference ΔTcLR shown are the far left of FIG. 5 (b), i.e., if the inside wheel drive force provisional value tTcIN calculated in step S16 of FIG. 3 is negative and it will not be possible to realize the rear wheel drive force difference ΔTcLR by dividing the rear wheel total drive force TcLR between the left and right rear wheels.

If the inside wheel provisional drive force tTcIN is set as the inside wheel target drive force MIN as in step S18 when the inside wheel provisional drive force value tTcIN is negative, then the inside wheel target drive force TcIN will be set to 0 as shown in FIG. 5 (b) and the outside wheel target drive force TcOUT will be set as TcOUT=ΔTcLR as shown in FIG. 5 (b) in order to realize the rear wheel drive force difference ΔTcLR. Consequently, the vehicle will not transmit a drive force to the rear wheel located on the inside of the turn and the vehicle will enter the unstable three-wheel drive state.

Therefore, in such a situation, the control selects step S19 instead of step S18. In step S19, the left-right rear wheel target drive force computing section 35 sets a default drive force TcMIN as shown in FIG. 5 (c). The default drive force TcMIN is minimum allowable value of the drive force necessary to prevent the unstable three-wheel drive state explained previously from occurring. Also in step S19, since the inside wheel target drive force TcIN=default drive force TcMIN, the outside wheel target drive force TcOUT is set to the sum of the default drive force TcMIN and the rear wheel drive force difference ΔTcLR as shown in FIG. 5 (c) so that the drive force values satisfy the rear wheel drive force difference ΔTcLR. Thus, step S19 corresponds to the target drive force limiting means mentioned in the claims.

After setting the outside wheel target drive force TcOUT and the inside wheel target drive force TcIN in the manner just explained, the computing section 35 executes the steps S21 to S23 of FIG. 4 to set the left rear wheel target drive force TcL and the right rear wheel target drive force TcR. Then, the four-wheel drive controller 21 controls electric currents supplied to the left rear wheel clutch 11L and the right rear wheel clutch 11R such that the holding forces of the left rear wheel clutch 11L and the right rear wheel clutch 11R correspond to the left wheel target drive force TcL and the right rear wheel target drive force TcR, respectively.

The default drive force TcMIN is a minimum allowable value of the drive force and is a minimum drive force necessary to prevent the unstable three-wheel drive state explained previously from occurring. If the default drive force TcMIN is set to 0, then the vehicle will enter a three-wheel drive state in which the vehicle turning performance is high but the turning stability of the vehicle is poor (turning performance and turning stability of mutually exclusive relationship). As the default drive force TcMIN increases from 0, a drive force is transmitted to the turning-direction inside rear wheel. The vehicle turning performance declines as the transmitted drive force increases, but the turning stability of the vehicle improves. The default drive force TcMIN as dependent on the rear wheel total drive force TcLR should be determined experimentally such that the turning performance and the turning stability are balanced in such a way as to meet design objectives.

Effects that are obtained with a left-right wheel (left and right rear wheels) drive force distribution control for a four-wheel drive vehicle according to the embodiment explained heretofore will now be explained. (1) If the rear wheel total drive force TcLR shown on the far left of FIG. 5 (a) is smaller than the rear wheel drive force difference ΔTcLR shown are the far left of FIG. 5 (b) (step S17), i.e., if the inside wheel drive force provisional value tTcIN calculated in step S16 is negative and it will not be possible to realize the rear wheel drive force difference ΔTcLR by dividing the rear wheel total drive force TcLR to the left and right rear wheels, then the control selects a loop passing through step S19 and, as shown in FIG. 5 (c), sets the default drive force TcMIN (step S19) as the inside wheel target drive force TcIN instead of setting the inside wheel provisional drive force tTcIN (step S18). The default drive force TcMIN is a minimum allowable value of the drive force necessary to prevent the unstable three-wheel drive state from occurring. The outside target drive force TcOUT is set to the sum of the initial drive force TcMIN and the rear wheel drive force difference ΔTcLR (step S19), which is a value that enables the rear wheel drive force difference ΔTcLR to be realized while the inside wheel target drive force TcIN is set to the initial drive force TcMIN.

Thus, a left-right wheel drive force distribution control can be executed such that the smaller inside wheel drive force MN does not fall below the default drive force (minimum allowable value) TcMIN. As a result, the drive force of the drive wheel located on the inside with respect to the turning direction, which is the side where the drive force is smaller, is prevented from becoming smaller than the default drive force (minimum allowable value) TcMIN and causing the problem of entering a three-wheel drive state in which the turning stability is poor. By avoiding the three-wheel drive state, the problem of producing an excessive turning performance during a turn, particularly on a road with a low-friction surface, and incurring a loss of turning stability can be prevented.

(2) In the embodiment, the outside target drive force TcOUT is set to the sum of the initial drive force TcMIN and the rear wheel drive force difference ΔTcLR (step S28), which is a value that enables the rear wheel drive force difference ΔTcLR to be realized while the inside wheel target drive force TcIN is set to the initial drive force TcMIN. By setting the outside target drive force TcOUT in this way, the previously explained operational effects can be obtained while realizing the rear wheel drive force difference ΔTcLR and the desired vehicle turning behavior can be achieved due to realizing the rear wheel drive force difference ΔTcLR. Particularly during turning, although the sizes of the friction circles of the inside and outside wheels will vary greatly due to load shifting, the embodiment enables the rear wheel drive force difference ΔTcLR to be realized. This is advantageous because it contributes greatly to improving the turning stability by enabling the differently sized friction circles of the inside and outside wheels to be utilized effectively.

(3) In the embodiment, the default drive force TcMIN is a minimum allowable value of the drive force required to prevent the three-wheel drive state from occurring and is set as a value that depends on the rear wheel total drive force TcLR such that the mutually exclusive turning performance and turning stability are balanced in a way that meets design objectives. As a result, even if the inside wheel target drive force TcIN is set to the default drive force TcMIN, the turning performance and the turning stability of the vehicle can be made to be in accordance with the objectives and a situation in which one or the other is sacrificed so as not to be in accordance with the objectives can be prevented.

(4) In the embodiment, since the determination as to whether the vehicle will enter the three-wheel drive state and the inside wheel target drive force TcIN should be set to the default drive force TcMIN is accomplished by determining if the rear wheel total drive force TcLR is smaller than the rear wheel drive force difference ΔTcLR, the determination can be accomplished simply and inexpensively by comparing the rear wheel total drive force TcLR and the rear wheel drive force difference ΔTcLR, which already exist in for the purposes of four-wheel drive control. Thus, the previously explained operational effects can be obtained simply and inexpensively.

The invention claimed is:

1. A vehicle left-right wheel drive force distribution control apparatus comprising:
a controller programmed to execute individual drive force controls of drive forces distributed to a pair of left and right subordinate drive wheels so as to simultaneously control a first distribution of drive forces between a pair of left and right main drive wheels and the pair of left and right subordinate drive wheels and control a second distribution of drive forces between the left and right subordinate drive wheels, the controller including
a subordinate drive wheel total drive force target value setting section that sets a subordinate drive wheel total drive force target value as a target value of a total drive force to be distributed to the left and right subordinate drive wheels;
a subordinate drive wheel drive force difference target value setting section that sets a subordinate drive wheel drive force difference target value as a target value of a difference between drive forces to be distributed to the left and right subordinate drive wheels;
a subordinate drive wheel target drive force computing section that computes a left target drive force of the left subordinate drive wheel and a right target drive force of the right subordinate drive wheel that achieve both the subordinate drive wheel total drive force target value set by the subordinate drive wheel total drive force target value setting section and the subordinate drive wheel drive force difference target value set by the subordinate drive wheel drive force difference target value setting section, and feeds the computed left and right target drive forces to the individual drive force controls of the drive forces directed to the left and right subordinate drive wheels;
a target value comparing section that determines whether the subordinate drive wheel total drive force target value is smaller than the subordinate drive wheel drive force difference target value; and
a target drive force limiting section that limits a smaller value of the left and right target drive force computed by the subordinate drive wheel target drive force computing section to a minimum allowable value upon the target value comparing section determining that the subordinate drive wheel total drive force target value is smaller than the subordinate drive wheel drive force difference target value.

2. The vehicle left-right wheel drive force distribution control apparatus according to claim 1, wherein
the subordinate drive wheel target drive force difference target value setting section sets the second distribution of the drive forces of the left and right subordinate drive wheels by:
estimating a longitudinal acceleration of the vehicle and a lateral acceleration of the vehicle, finding a left-right subordinate drive wheel drive force difference necessary to resolve an under-steering state of the vehicle based on a combination of the longitudinal and lateral accelerations, and setting the same as a steady-state control amount;
computing a target yaw rate based on a steering angle and a vehicle speed, finding a left-right subordinate drive wheel drive force difference corresponding to the target yaw rate, and setting the same as a transient control amount; and
distributing a sum value of the steady-state control amount and the transient control amount such that a left-right subordinate drive wheel drive force difference targeted during a vehicle turning behavior is obtained.

3. The vehicle left-right wheel drive force distribution control apparatus according to claim 1, wherein
the controller is programmed to execute the individual drive force controls of the drive forces to rear wheels of the vehicle as the left and right subordinate drive wheels.

4. The vehicle left-right wheel drive force distribution control apparatus according to claim 1, wherein
the target drive force limiting section replaces a larger of the left and right target drive forces of the left and right subordinate drive wheels computed by the subordinate drive wheel target drive force computing section to with a sum value of the minimum allowable value and the subordinate drive wheel drive force difference target value, and feeds the replaced left or right target drive force to the individual drive force control of the drive force distributed to the corresponding left or right subordinate drive wheel, upon the target value comparing section having determined that the subordinate drive wheel total drive force target value is smaller than the subordinate drive wheel drive force difference target value.

5. The vehicle left-right wheel drive force distribution control apparatus according to claim 4, wherein
the subordinate drive wheel drive force difference target value setting section sets the first distribution of drive forces between the pair of main drive wheels and the pair of subordinate drive wheels in accordance with a drive slippage degree of the left and right main drive wheels, a longitudinal acceleration of the vehicle and an accelerator opening degree.

6. The vehicle left-right wheel drive force distribution control apparatus according to claim 4, wherein
the subordinate drive wheel target drive force difference target value setting section sets the second distribution of the drive forces of the left and right subordinate drive wheels by:
estimating a longitudinal acceleration of the vehicle and a lateral acceleration of the vehicle, finding a left-right subordinate drive wheel drive force difference necessary to resolve an under-steering state of the vehicle based on a combination of the longitudinal and lateral accelerations, and setting the same as a steady-state control amount;
computing a target yaw rate based on a steering angle and a vehicle speed, finding a left-right subordinate drive wheel drive force difference corresponding to the target yaw rate, and setting the same as a transient control amount; and
distributing a sum value of the steady-state control amount and the transient control amount such that a left-right subordinate drive wheel drive force difference targeted during a vehicle turning behavior is obtained.

7. The vehicle left-right wheel drive force distribution control apparatus according to claim 4, wherein
the controller is programmed to execute the individual drive force controls of the drive forces to rear wheels of the vehicle as the left and right subordinate drive wheels.

8. The vehicle left-right wheel drive force distribution control apparatus according to claim 1, wherein
the subordinate drive wheel drive force difference target value setting section sets the first distribution of drive forces between the pair of main drive wheels and the pair of subordinate drive wheels in accordance with a drive slippage degree of the left and right main drive wheels, a longitudinal acceleration of the vehicle and an accelerator opening degree.

9. The vehicle left-right wheel drive force distribution control apparatus according to claim 8, wherein
the subordinate drive wheel target drive force difference target value setting section sets the second distribution of the drive forces of the left and right subordinate drive wheels by:
estimating a longitudinal acceleration of the vehicle and a lateral acceleration of the vehicle, finding a left-right subordinate drive wheel drive force difference necessary to resolve an under-steering state of the vehicle based on a combination of the longitudinal and lateral accelerations, and setting the same as a steady-state control amount;
computing a target yaw rate based on a steering angle and a vehicle speed, finding a left-right subordinate drive wheel drive force difference corresponding to the target yaw rate, and setting the same as a transient control amount; and
distributing a sum value of the steady-state control amount and the transient control amount such that a left-right subordinate drive wheel drive force difference targeted during a vehicle turning behavior is obtained.

10. The vehicle left-right wheel drive force distribution control apparatus according to claim 8, wherein
the controller is programmed to execute the individual drive force controls of the drive forces to rear wheels of the vehicle as the left and right subordinate drive wheels.

* * * * *